April 9, 1929.  S. K. CARAS  1,708,752
CARRIER FOR POTTED PLANTS
Filed Sept. 20, 1927  2 Sheets-Sheet 1
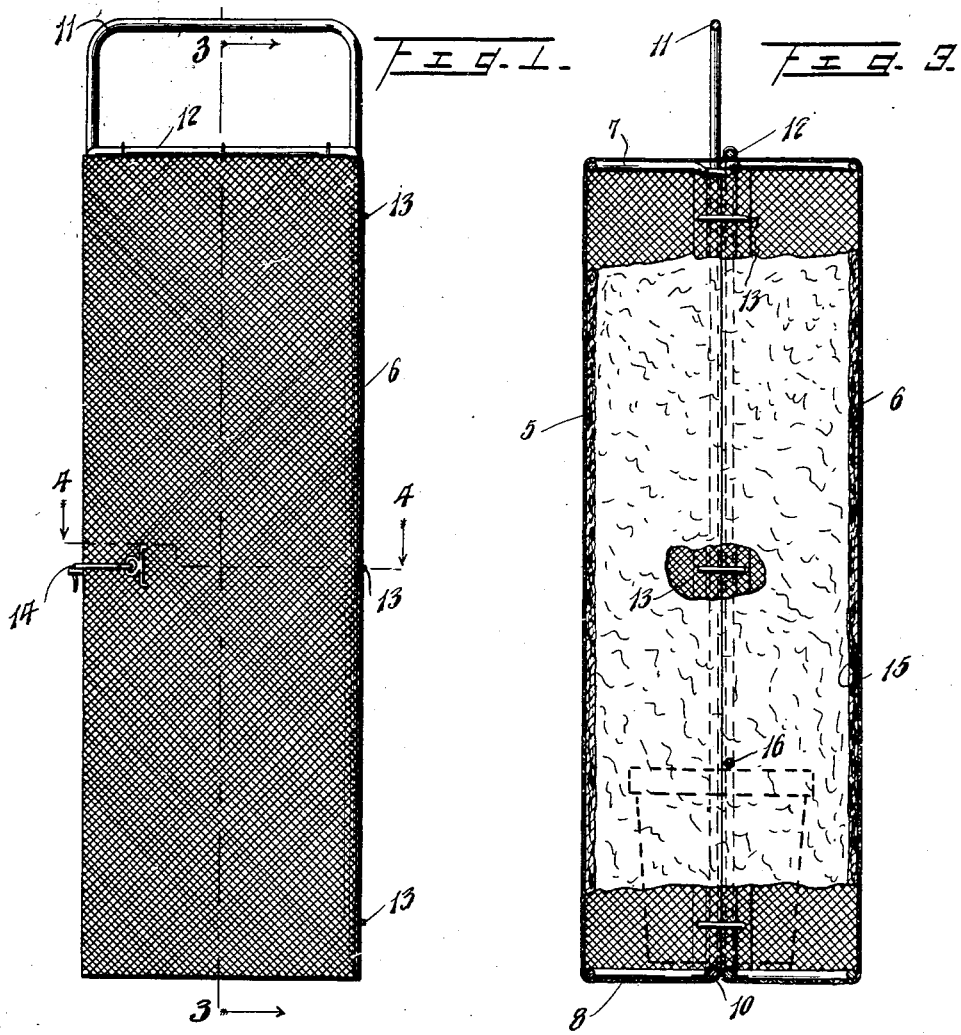
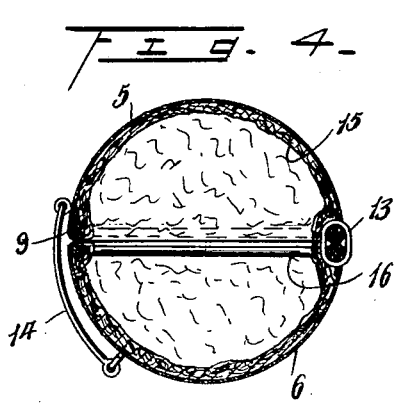
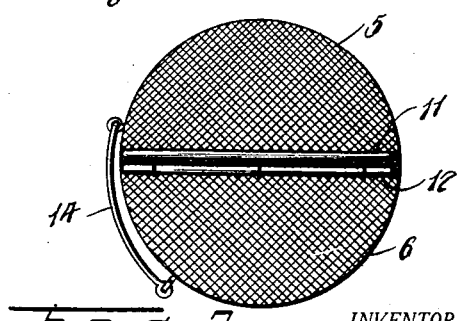
INVENTOR.
S. K. Caras.
BY
ATTORNEY.

April 9, 1929. S. K. CARAS 1,708,752
CARRIER FOR POTTED PLANTS
Filed Sept. 20, 1927   2 Sheets-Sheet 2
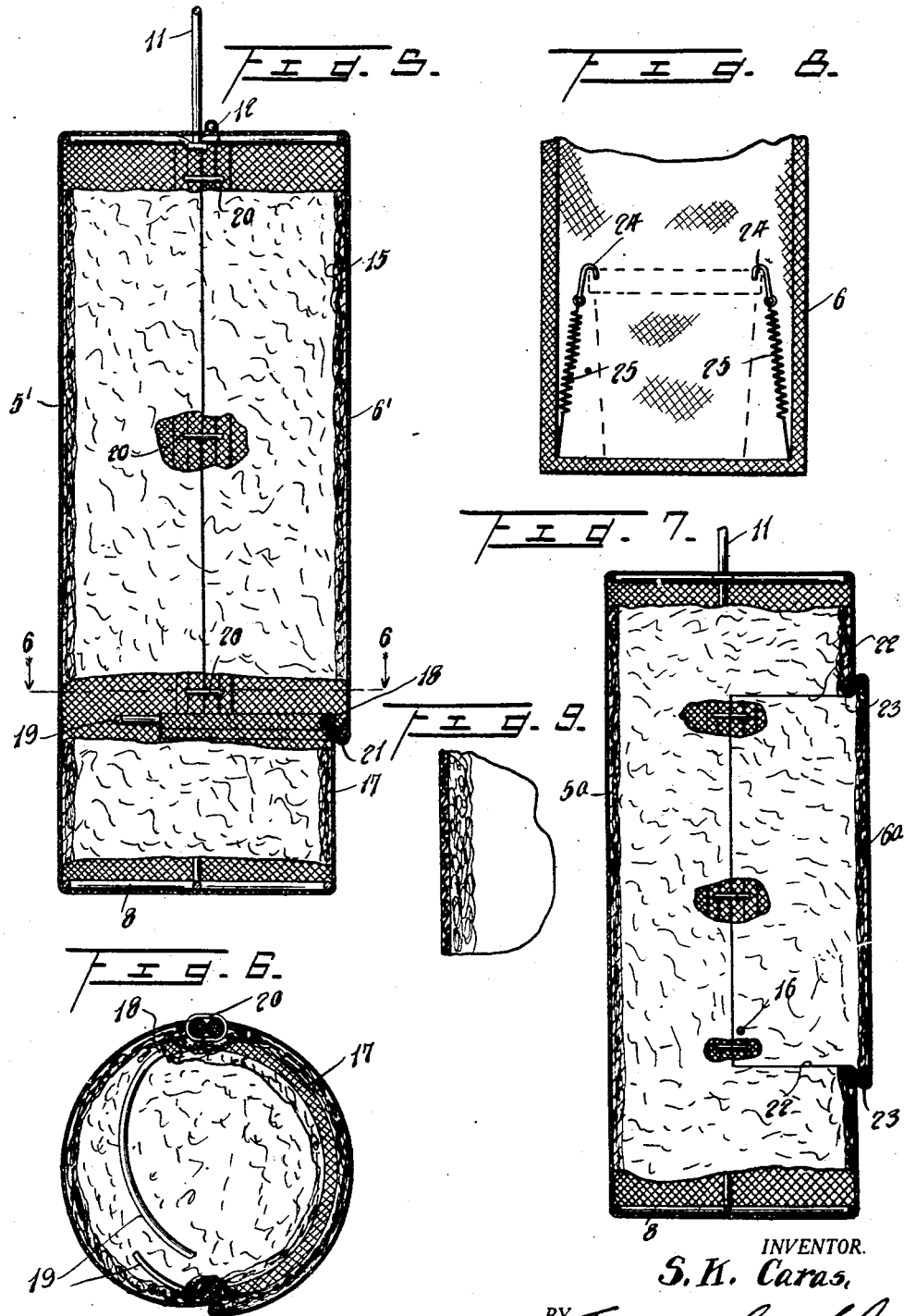

Patented Apr. 9, 1929.

1,708,752

UNITED STATES PATENT OFFICE.

SAM K. CARAS, OF MISSOULA, MONTANA.

CARRIER FOR POTTED PLANTS.

Application filed September 20, 1927. Serial No. 220,795.

This invention relates to certain new and useful improvements in carriers and has for its object to facilitate the safe and convenient handling and delivery of potted plants, flowers or other perishable articles that must be protected against exposure and sun changes or extremes of temperature.

Other purposes, advantages and characteristic features of the invention will be more readily understood from the following detailed description and accompanying drawings in which:

Figure 1 is a view in side elevation of a carrier constructed in accordance with my invention.

Figure 2 is a top plan view.

Figure 3 is a longitudinal sectional view taken along the line 3—3 of Figure 1.

Figure 4 is a longitudinal sectional view taken along the line 4—4 of Figure 1.

Figure 5 is a view similar to Figure 3 but showing a modification.

Figure 6 is a transverse sectional view taken along the line 6—6 of Figure 5.

Figure 7 is a view similar to Figure 5 but showing a still further modification.

Figure 8 is a fragmentary sectional view showing a modification of one of the details of the invention, and, Figure 9 is a fragmentary vertical sectional view of a modified wall construction.

In describing the invention in detail reference will first be had to the form of invention illustrated in Figures 1 to 4 inclusive. The carrier or container shown in these figures is cylindrical in shape to adapt itself to the natural cylindrical form of growing plants and consist of two semicircular wire cloth casing sections 5 and 6 carried by suitable frames. Each frame is formed of strand wire fabricated to provide upper and lower semicircular end members 7 and 8 terminally connected by vertically extending side members 9, the terminals of the semicircular body members 8 of each frame being further connected by a transverse member 10. The side members of the frame of section 5 are extended above the top of the section and connected by a handle portion 11 while the upper ends of the side members of the frame of section 6 are connected by a cross member 12. Corresponding side members 9 of the two sections are hinged together as at 13 while the remaining side members of the two sections are adapted to be releasably secured in abutting engagement by the hook and eye fastening 14.

The entire inner surface of the container afforded by the sections 5 and 6 is lined with a suitable heat retaining and insulating member 15 of any suitable character such as non-porous paper, felt or other lining substances capable of making the container air-tight and conserving the natural heat of articles placed therein. At a suitable distance above the bottom of the container one of the sections, in the present instant section 6, is provided with a cross bar 16 which is adapted to engage over the upper edge of the article holder such as a flower or plant pot when the latter is placed therein as indicated by dotted lines to hold the pot against tilting movement within the container.

In the modification shown in Figures 5 and 6 the container, while similar in other respects to the container shown in Figure 1, differs from the latter in that one of the two half sections, such as section 5', is so constructed as to present near its lower end a cylindrical pot-receiving portion 17, the upper end of which is reinforced by a split ring 18 of spring wire. This spring is adapted to embrace the pot for holding the same securely and has its terminal ends 19 flexed to spring inwardly against the pot for confining the latter within the ring. The other half section 6', which is hingedly connected to section 5' as seen at 20, is just long enough to extend from the top of the container to a point below the upper edge of the bottom portion 17, thereby overlapping the said bottom portion as seen at 21. By this construction, the pot is securely and entirely supported in the bottom portion of one section and can be conveniently removed or replaced therein when the hingedly mounted section is in open position. It will be understood, of course, that suitable latch means is employed to fasten one section to the other.

In the form shown in Figure 7, the container consists of a cylindrical section 5ª which is closed at the top, bottom and sides. On one side, however, the container is cut away as indicated at 22 to provide a longitudinally extending opening through which access is had to the interior of the container for placing potted plants, etc. therein. The shell of the container is lined and reinforced similarly to the previously described containers and hingedly mounted section 6ᵃ is provided for closing the opening, the upper and lower ends of the hinged section 6ᵃ overlapping the edges of the cut-out as seen at 23.

In Figure 6 is shown a modified form of pot-holding means in which the upper edge of the pot is grasped by two or more hooks 24, each hook being mounted at the upper end of a helical spring 25 fastened at its lower terminal to the bottom of the container. The springs are tensioned to exert a downward pull in the hooks which are on opposite sides of the pot and thus hold the latter firmly and securely. The spring enables the hooks to be easily adjusted for different sized pots.

The containers above described are shown as being lined with a blanket of suitable insulating material, the same being used as a padding for the container. However, the lining may also be arranged as shown in Figure 9, to fill the interstices of the screen shell. For this purpose, the lining material may be of celluloid, non-porous paper or some similar substance with the mesh of the screen embodied therein so as to present a filled screen shell.

The container may be constructed of wire netting, sheet metal, or even of wood for continuous use but for purposes of shipment, when the container might not be returned, it can be made from corrugated paper or other material. The insulating and heat retaining lining conserves the natural heat of the plant and protects the plant from harm by frost or cold, thus facilitating the handling by delivery-boys about the city or point of distribution.

Having thus described the invention, what is claimed is:

1. A container for potted plants comprising two semi-circular wire cloth casings, a reinforcing frame carried by each casing, the side members of the frame of one casing being extended above the top of the section to provide a handle, a hinge connection between corresponding side members of the two frames, and a padding of non-porous heat-retaining material carried by each frame for enclosing the plant in an air-tight chamber serving to conserve the natural heat of the plant.

2. A container for potted plants comprising a casing consisting of semicircular sections longitudinally hinged together, a cylindrical section carried by the lower edge of one of said semicircular sections and forming a plant receiving cup, means for securing said semicircular sections together and a padding of non-porous heat retaining material lining the inner surface of the casing.

3. A container for potted plants comprising cylindrical end portions connected by an integral semicylindrical portion, a second semicylindrical portion having one longitudinal edge hinged to a corresponding edge of the first mentioned semicylindrical portion and made of sufficient length to overlap the opposing free edges of the cylindrical portions to form a closure for the casing.

In testimony whereof I hereunto affix my signature.

SAM K. CARAS.